United States Patent
Tosello

(10) Patent No.: US 8,820,254 B2
(45) Date of Patent: Sep. 2, 2014

(54) CATAMARAN SHIP USED FOR ASSEMBLING, TRANSPORTING AND INSTALLING A MARINE WIND TURBINE ON THE SEAFLOOR

(75) Inventor: André Tosello, Chatenay-Malabry (FR)

(73) Assignee: Saipem S.A., Montigny le Bretonneux (FR)

( * ) Notice: Subject to any disclaimer, the term of this patent is extended or adjusted under 35 U.S.C. 154(b) by 59 days.

(21) Appl. No.: 13/384,154

(22) PCT Filed: Jun. 18, 2010

(86) PCT No.: PCT/FR2010/051224
§ 371 (c)(1),
(2), (4) Date: Feb. 1, 2012

(87) PCT Pub. No.: WO2011/007066
PCT Pub. Date: Jan. 20, 2011

(65) Prior Publication Data
US 2012/0118215 A1    May 17, 2012

(30) Foreign Application Priority Data
Jul. 15, 2009 (FR) ..................................... 09 54884

(51) Int. Cl.
*B63B 1/00* (2006.01)

(52) U.S. Cl.
USPC .......... 114/61.1; 405/203; 405/205; 405/206; 405/209; 405/224

(58) Field of Classification Search
USPC ........... 114/61.1–61.22, 264, 274; 405/195.1, 405/196, 200, 203, 205, 206, 209, 224
See application file for complete search history.

(56) References Cited

U.S. PATENT DOCUMENTS

| | | | | |
|---|---|---|---|---|
| 3,541,987 A | * | 11/1970 | Barkley | 114/61.16 |
| 4,856,446 A | * | 8/1989 | Herard | 114/61.22 |
| 6,253,700 B1 | * | 7/2001 | Gorlov | 114/274 |
| 6,338,307 B1 | * | 1/2002 | Pires | 114/61.1 |
| 6,766,643 B2 | * | 7/2004 | Christensen | 60/398 |
| 7,287,480 B2 | * | 10/2007 | Lin | 114/61.12 |
| 2003/0192465 A1 | | 10/2003 | Roodenburg | |
| 2004/0262926 A1 | | 12/2004 | Hansen | |
| 2009/0058090 A1 | * | 3/2009 | Henriksen | 290/53 |
| 2011/0074155 A1 | * | 3/2011 | Scholte-Wassink | 290/44 |
| 2011/0139056 A1 | * | 6/2011 | Cholley et al. | 114/264 |

FOREIGN PATENT DOCUMENTS

| | | |
|---|---|---|
| WO | WO 03/055741 | 7/2003 |
| WO | WO 03/066426 | 8/2003 |
| WO | WO 03/066427 | 8/2003 |
| WO | WO 2008/071861 | 6/2008 |

* cited by examiner

*Primary Examiner* — Lars A Olson
*Assistant Examiner* — Jovon Hayes
(74) *Attorney, Agent, or Firm* — Cozen O'Connor

(57) ABSTRACT

A catamaran-type boat suitable for handling, assembling, and/or transporting off-shore wind turbines, the boat having two side floats constituting a U-shaped floating structure, the open space between the two branches of the U-shape constituted by the two side floats being suitable for receiving a base, the floats being fitted with grippers suitable for gripping the base between the two side floats, and the grippers being suitable for gripping the base and at least two grip levels of different heights.

14 Claims, 4 Drawing Sheets

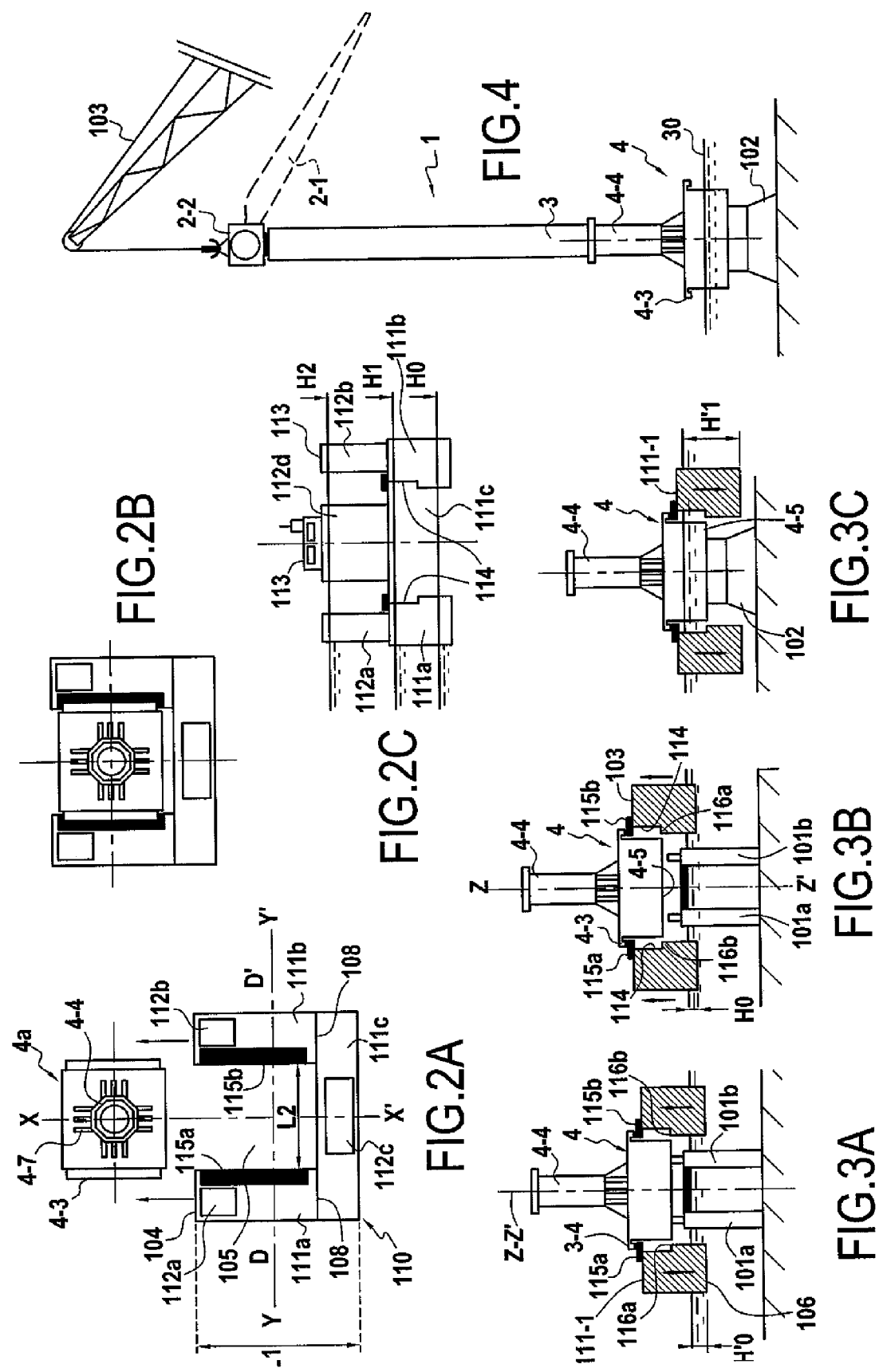

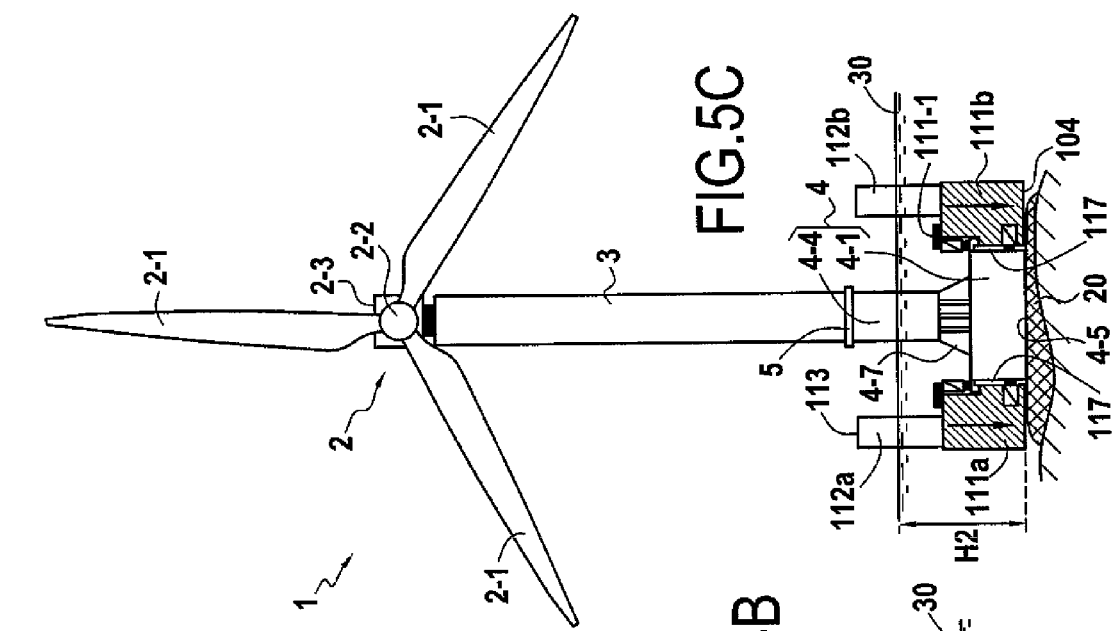
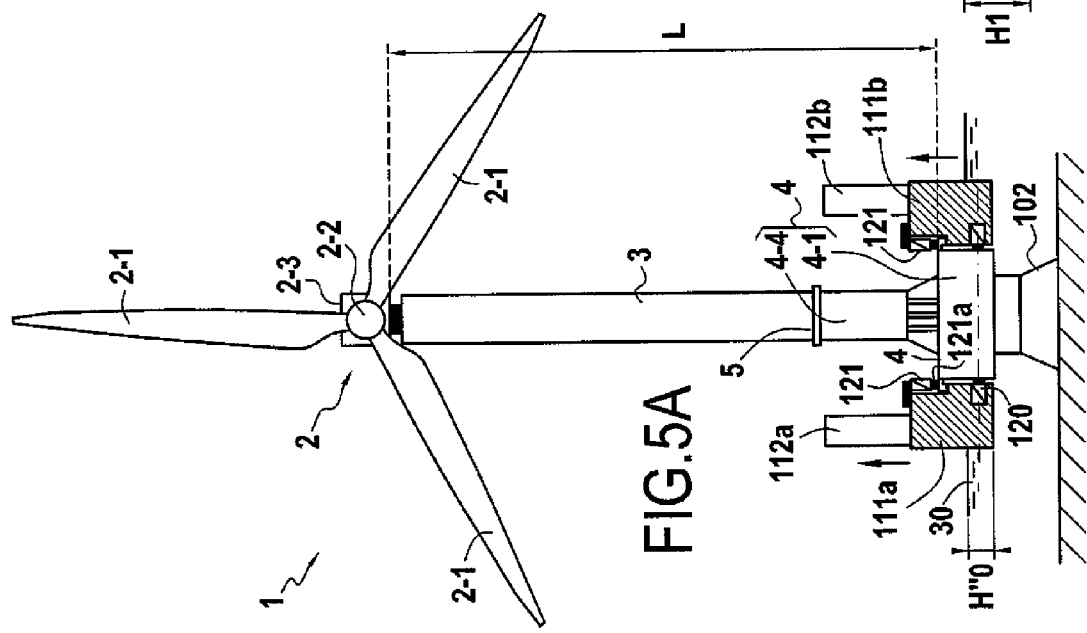

US 8,820,254 B2

CATAMARAN SHIP USED FOR ASSEMBLING, TRANSPORTING AND INSTALLING A MARINE WIND TURBINE ON THE SEAFLOOR

PRIORITY CLAIM

This is a U.S. national stage of application No. PCT/FR2010/051224, filed on 18 Jun. 2010. Priority is claimed on France Application No. 0954884 filed 15 Jul. 2009, the content of which is incorporated here by reference.

FIELD OF THE INVENTION

The present invention relates to wind turbines installed off shore, in particular out at sea.

More particularly, the technical field of the invention is that of fabricating, transporting, and installing wind turbines for producing electricity, more particularly off-shore wind turbines of very large capacity that are designed to be installed at sea, more particularly away from coasts and in large numbers in order to form wind-turbine fields.

BACKGROUND OF THE INVENTION

Although terrestrial wind engines have been built over the last few centuries, building wind turbines at sea is much more recent.

A modern wind turbine, whether for use on land or off shore, generally comprises a horizontal axis engine having a plurality of blades and an electricity generator coupled to the engine, both of them being fastened to the top end of a vertically elongate support such as a mast or pylon.

In order to reduce the cost of wind-generated energy and increase the efficiency of generators, ever more powerful generators are being fabricated that are installed in grouped manner so as to form a wind-turbine farm or field.

Increasing the power of a wind-turbine generator involves also increasing its weight and the height of the structure that supports it.

For economic reasons, it is necessary to implement wind turbines that are ever more powerful and thus of ever greater dimensions, and in particular of ever greater heights. Similarly, such wind turbines are being installed at ever greater distances from the shore and therefore in ever greater depths.

The invention applies particularly, i.e. in non-limiting manner, to wind turbines having a generator of power lying in the range 100 kilowatts (kW) to 10 megawatts (MW), the weight of such a generator possibly reaching or exceeding 300 (metric) tonnes (t) or 500 t; the length of a pylon supporting the generator may be of the order of 50 meters (m) to 100 m, and the weight of the pylon may lie in the range 100 t to 500 t.

It can thus be understood that constructing such wind turbines and installing them at sea presents great difficulties. Various solutions have been proposed for constructing and installing off-shore wind turbines.

The wind turbine is generally constructed using conventional traction hoist means such as crane type hoists. An assembly is built comprising a base surmounted by a pylon having a wind engine and an electricity generator fastened to the top thereof.

Nevertheless, once they have been constructed, wind turbines present dimensions that are large and constitute loads that are heavy, as mentioned above, such that such wind turbines are not easy to transport at sea to their operating sites.

Furthermore, it can be understood that installing a wind turbine using cranes acting by traction requires the cranes to be of large dimensions, and in particular of height that is greater than the height of the wind turbine. For wind turbines of the above-mentioned dimensions, it is necessary to use cranes weighing at least 350 t and having a jib having a length of at least 50 m and generally closer to 100 m, where such cranes are difficult to mount and to move, and in particular to transport and to operate at sea. It is not reasonable to envisage transporting such crane-type hoist means on floating barges, as is sometimes appropriate for certain operations in off-shore oil fields, given the size they represent and the instability of a barge in a rough sea, with this applying both during transport and during hoisting operations.

Off-shore wind turbines are described in WO 01/34977 and WO 03/004870, for example. They are assembled on land and then transported by boat to their operating sites at sea away from the shore. In WO 01/34977 the wind turbine includes watertight tanks that can be ballasted with sea water or deballasted during transport. More particularly, the ship includes a narrow slot of width that enables only the pylon to be inserted therein, the base of the wind turbine being below the hull of the ship, and ballasted in part so that, by virtue of its buoyancy, its top face exerts thrust against the bottom face of the hull of the ship. However, during transport, fastening of the wind turbine to the ship is not reliable and requires not only very calm sea conditions but also subjects the fastening between the pylon and the base to high levels of stress that may harm the mechanical reliability of said fastening. Furthermore, the effects of swell and current on the base during transport give rise to forces that are considerable and thus to bending moments that are considerable at the device secured to the ship for gripping the pylon, thereby requiring large amounts of localized reinforcement in the grip system. Finally, the wind turbine is not guided in stabilized manner while it is being ballasted in order to be placed on the sea bottom.

WO 03/066426 describes a catamaran boat having two side floats constituting a U-shaped floating structure suitable for transporting a wind turbine at sea while it is placed between the two side floats, and for placing it on the sea bottom. The boat is fitted with devices for hoisting/lowering said wind turbine, said hoisting/lowering device and/or said wind turbine moving vertically relative to the two side floats in order to move the wind turbine from the surface to the bottom of the sea. That device for hoisting/lowering the wind turbine and the means for holding and guiding said wind turbine between the two side floats represent bulk and weight that are large on the deck of the U-shaped floating structure.

SUMMARY OF THE INVENTION

The object of the present invention is thus to provide an improved method of assembling an off-shore wind turbine, of transporting it, and of installing it at sea, which method remedies at least in part the drawbacks of presently-known methods of assembling off-shore wind turbines, of transporting them, and of placing them on the sea bottom.

More particularly, the present invention seeks to facilitate installing a wind turbine on its production site, in particular on an underwater site far from the shore, by proposing a wind turbine that is simpler to construct and to install.

To do this, the present invention provides a catamaran type boat suitable for use in assembling off-shore wind turbines, in transporting them, and in placing them on the sea bottom, the wind turbine comprising at least:

a base for resting on or being anchored to the sea bottom;

a pylon suitable for being supported by said base, preferably having its bottom end fixed in said base; and a wind engine suitable for being fitted to the top of said pylon;

said boat comprising two side floats having longitudinal axes arranged in parallel in the longitudinal direction XX', said side floats being connected together by a transverse connection structure, preferably a front transverse float extending in a direction YY' perpendicular to said longitudinal direction XX', and connecting together the two side floats at one of their ends so as to constitute a U-shaped floating structure; and the open space between the two branches of the U-shape constituted by the two side floats being suitable for receiving a said base, preferably having a width of at least 20 m, said floats being fitted with gripper means suitable for gripping said base between said two side floats, said side floats including watertight compartments suitable for being ballasted and de-ballasted, preferably with sea water;

the boat being characterized in that said gripper means are suitable for gripping said base at least the following two different grip levels:

an upper grip level in which it is possible to grip said base when the bottom of said base is above the bottoms of said side floats, with the bottom of the base preferably being above water level, and when said two side floats are at least partially de-ballasted; and a lower grip and lock level in which the bottom of the base is situated below the bottoms of said side floats, said gripper means of the base for said lower level including locking means for locking the base and suitable for making a rigid connection between said side floats and said base.

It can be understood that said rigid connection provided by said locking means prevents any vertical movement and any horizontal movement of said base relative to said side floats.

Because the spacing between the two side floats is large, since they are suitable for receiving said wind-turbine base in the open space between them, where this represents a distance between the two side floats that is generally at least 20 m, and preferably lies in the range 30 m to 50 m, a catamaran-type boat of the invention presents great stability, thereby enabling it to operate in stable manner for moving wind turbines that are more than 100 m tall, while making use of draughts that are extremely small or extremely large under satisfactory safety conditions. Thus, the catamaran of the invention may operate over a broader spectrum of handling operations in port, in particular for recovering bases from a quay or pontoon by operating with a minimum draught, and may also operate for putting wind turbines into place in relatively great depths while operating with a maximum draught.

More particularly, the base may be taken hold of at a said upper grip level by the catamaran, in particular for handling between a quay or pontoon in a port and an assembly zone within the port.

Because of the U-shape of such a catamaran, it generally presents stiffness in twisting about its central horizontal axis XX that is relatively poor, regardless of the amount of the reinforcement that may be imparted to the connections between the various floats. By fixing the catamaran to the base using powerful mechanical blocks, both horizontally and vertically, the twisting stiffness of the assembly is hugely increased.

In accordance with the present invention, it is possible to lower said wind turbine to the sea bottom merely by ballasting said side floats, while said base is locked at said lower grip level, without having recourse to means for hoisting/lowering the wind turbine to cause it to move relative to said side floats in order to place the wind turbine on the sea bottom.

It can thus be understood that while the base is being lowered from the surface or the subsurface to the sea bottom in order to put the wind turbine into place, and once said locking means have been operated, there is no movement between the various elements making up said gripper means and/or said locking means relative to one another and there is no movement of said base relative to said side floats, with lowering being achieved entirely by ballasting said side floats.

Thus, the design of the catamaran of the invention is greatly simplified and requires less reinforcement in the connection between the various floats, thereby considerably reducing the cost and the complexity of constructing such a catamaran.

Because of said locking means, the catamaran can be fixed to said base and the catamaran-and-base assembly then presents great overall stiffness at said lower grip level so as to enable the wind turbine to be safely transported to its site while using the most stable draught $H_1$ of the catamaran, after which the operation of placing the wind turbine on the sea bottom by ballasting said floats may be performed in such a manner as to cause the catamaran to adopt a maximum draught $H_2$.

The catamaran-type boat of the present invention is particularly advantageous in that it makes it possible to achieve a rigid connection between the wind turbine and said boat, which connection is suitable for the various stages of handling, assembling, or transporting the wind turbine by making use of one or the other of said grip levels as explained above.

More particularly, said locking means comprise:

vertical clamping means co-operating with said base and each of the two side floats, suitable for blocking any vertical movement of the base relative to each of said side floats; and horizontal clamping means co-operating with said base and each of the two side floats, suitable for blocking any horizontal movement of the base relative to each of said side floats.

Still more particularly:

said gripper means at said upper grip level comprise upper reinforced structural elements of said base suitable for bearing against and being supported by upper reinforced structural elements of each of the two side floats when said two side floats are at least partially de-ballasted, the bottom of said base being situated above the bottoms of each of the two side floats; and said gripper and locking means at said lower grip level comprise:

vertical upper clamping means suitable for vertically forcing upper reinforced structural elements of said base against lower reinforced structural elements of each of said side floats; and horizontal lower clamping means suitable for exerting horizontal thrusts in opposite directions between each of two opposite outer side walls of said base and respective ones of the two facing inner margins of each of said two side floats, thereby preventing any horizontal movement of said base relative to said two side floats.

It should be understood that "thrust in opposite directions" means that the thrust between a first side wall of the base and a first inner margin of a first side float takes place in a direction opposite to that of the thrust between the second side wall of the base and the inner margin of the second side float.

In a preferred embodiment, said side floats are surmounted by upper buoyancy structures referred to as "chimneys" and of horizontal section smaller than the section of said side floats above which they extend over a height $h_3$ such that, when said side floats are in a maximally-ballasted totally-submerged position, the top ends of said chimneys project above the water level.

These chimney-shaped buoyancy elements enable said wind turbine to be placed on the sea bottom while being kept locked to said catamaran and while ballasting the side floats, and, where appropriate, possibly also the chimneys in partial manner, said chimneys acting by means of their positive buoyancy to stabilize the assembly while the catamaran and the wind turbine are being lowered to the sea bottom in order to place the wind turbine on the sea bottom.

This embodiment is particularly advantageous since adding chimneys that are far apart from one another and that are situated at the ends of the catamaran greatly reduces the height of the main hull of said catamaran and thus its own weight and cost, while conserving great latitude between its minimum and maximum draughts, thereby enabling the base to be placed in complete safety onto its site in depths of water that are very great.

Advantageously, the catamaran-type boat of the invention includes at least three chimneys including one chimney substantially on the axis of said boat in the middle of said transverse float, and two chimneys at the free stern ends of respective ones of the two side floats.

This embodiment makes it possible to obtain maximum spacing between said chimneys and thus to provide for better stability of the boat.

According to other particular characteristics:
the total height ($h_3+h_4$) of said side floats $h_4$ and of said chimneys $h_3$ is such that said catamaran can adopt:
 a minimum draught $H_0$ in which said upper gripper means and/or the top surfaces of said side floats are at a height of at least 5 m, and preferably at least 10 m above the water level; and
 a maximum draught $H_2$ of at least 25 m, preferably at least 50 m, in which said side floats are totally submerged and the top ends of said chimneys remain above the water;
the height $h_4$ of said side floats is at least 5 m, preferably lying in the range 5 m to 15 m; and
the height $h_3$ of said chimneys is at least 15 m, preferably lying in the range 15 m to 35 m.

Still more particularly, said gripper means comprise:
upper first reinforced structural elements, preferably in the form of plates extending in the longitudinal direction XX' of said side floats along the top edges of the inner margins of said side floats to which they are secured, more preferably projecting into said open space of the U-shape; and
lower second structural elements secured to said inner margins of the side floats and situated lower than said upper first reinforced structural elements; and
third reinforced structural elements secured to said base, extending along the opposite upper edges of the outer side walls of said base, preferably the upper edges of the opposite and parallel outer walls of a said rectangular base, projecting outwards therefrom, such that:
 said upper first reinforced structural elements of said side floats are suitable for supporting said upper third reinforced structural elements of said base in order to grip at a said upper grip level, while said base is inserted between said two side floats and said two side floats are partially de-ballasted so as to exert upward thrust from said upper first reinforced structural elements of the side floats against said upper third reinforced structural elements of said base; and
 said lower second reinforced structural elements of said side floats are suitable for supporting said upper third reinforced structural elements of said base in order to grip at a said lower grip level when said base is inserted between the two side floats and said side floats are partially de-ballasted in order to exert upward thrust from said lower second reinforced structural elements of the side floats against said upper third reinforced structural elements of said base.

The term "reinforced" is used herein to mean that the thickness of said structural elements is greater than the thickness of the other structural elements and/or portions constituting the side floats or the base and on which they are applied or with which they co-operate, or indeed that they include gussets or any other type of reinforcement.

Still more particularly, said locking means of the gripper means at a lower grip level comprise:
vertical upper clamping means at least some of which are secured to said upper first reinforced structural elements, said vertical upper clamping means being suitable for forcing said upper third reinforced structural elements of the base against said second reinforced structural elements of the side floats, which elements are preferably in the form of steps; and
horizontal lower clamping means, at least some of which are secured to the inner margins of said side floats below said lower second reinforced structural elements of the floats, preferably in the form of steps, said lower clamping means being suitable for exerting thrust against said opposite outer side walls of said base.

In a first embodiment, said lower second structural elements are reinforced structural elements of step-shape extending in the longitudinal direction XX' of said side floats along said inner margins of the side floats, to which they are connected.

In a preferred embodiment:
said vertical clamping means comprise vertical upper clamping actuators having their cylinders secured to said upper first reinforced structural elements and the ends of their rods suitable for forcing said upper third reinforced structural elements of the base against second reinforced structural elements of the side floats in the form of steps; and
said horizontal lower clamping means comprise horizontal lower clamping actuators having their cylinders secured to the inner margins of said side floats below said lower second reinforced structural elements of the floats in the form of steps and their rods extending in opposite directions so as to exert thrust against said opposite outer side walls of said base.

This embodiment is advantageous, since after said horizontal and vertical actuators and said second horizontal actuators have been retracted, it is possible to disengage the catamaran after placing the base on the sea bottom merely by moving vertically as a result of increasing the ballasting of the floats of said catamaran, whereas in the version in which the lower second structural elements are merely steps without any hinge abutment, it is necessary to move the catamaran in the longitudinal direction XX' of said floats in order to disengage from said base, before it is possible to raise it to the surface.

More particularly, said lower second structural elements comprise steps in the inner margins of the side floats, in which steps pivotally-hinged abutments are suitable for being pivoted about their bases received in said steps by means of second horizontal actuators suitable for thrusting the upper ends of said abutments against the under-faces of said upper third reinforced structural elements in the form of side lugs of said base.

The method of the invention enables wind turbines to be installed at sea at considerable distances from the shore and in depths that may be as much as 35 m or even 50 m, without difficulty.

It also makes it easier to install driving turbines at a great height above the waves, in particular more than 100 m, thereby enabling the diameter of the rotor to be increased and thus enabling the unit power of the engine to be increased.

The present invention also provides a method of handling and assembling an off-shore wind turbine in a port and/or of transporting it at sea and of placing it on the sea bottom, the wind turbine comprising at least:

a base for resting on or being anchored to the sea bottom;
    a pylon suitable for being supported by said base, preferably having its bottom end fixed in said base; and
    a wind engine suitable for being fitted to the top of said pylon;

the method making use of a catamaran-type boat of the invention and being characterized in that the following initial steps are performed in succession:

1) gripping said base on its own using a said catamaran-type boat, in which the gripper means grip said base at a said upper grip level, the bottom of said base being situated above the water level, preferably on a pontoon of a quay of the port; and 2) preferably, lifting said base relative to said pontoon by additionally de-ballasting said floats; and 3) moving said base by moving said boat within the port; and 4) placing said base on a support structure referred to as a "stool", resting on the bottom of the port, with this being done by ballasting said floats; and 5) disengaging said catamaran from said base; and 6) assembling a said pylon on said base, preferably by fixing its bottom end to said base and fastening said wind engine to the top of said pylon by using a said crane; and 7) gripping said base fitted with said wind turbine at a said lower grip level, the bottom of said base being underwater; then 8) using said catamaran to transport said base fitted with said wind turbine out to sea, before placing it on the sea bottom; and 9) ballasting said floats so as to cause them to be completely underwater and placing said base on its installation site on the bottom of the sea; and 10) disengaging said catamaran from said base by unlocking said locking means, and then moving said catamaran and causing it to rise, reducing its draught, by de-ballasting its said floats at least in part.

More particularly, in the handling, assembly, and transport method of the invention, said assembled wind turbine is transported from its assembly site in the port to a site for installation at sea using a said catamaran-type boat, by performing the following steps in succession:

1) taking hold of said wind turbine at its said base resting on a said stool using said gripper means at a said lower grip level, and locking said gripper means in such a manner that the connection between said base and said side floats is a rigid connection; and 2) preferably, raising said wind turbine so that the bottom of its said base is disengaged from said stool, with this being done by additional de-ballasting of said floats; and 3) moving said wind turbine with its base locked in this way to the site for installation at sea, said floats preferably being ballasted with an intermediate draught $H_1$; and 4) ballasting said floats so as to cause them to be totally underwater and placing said base on its installation site on the sea bottom; and 5) disengaging said catamaran from said base by unlocking said locking means and then moving said catamaran and causing it to rise, reducing its draught, by de-ballasting its said floats, at least in part.

More particularly, said floats include said chimneys, which chimneys remain partially underwater when said side floats are ballasted to lower and place said base on the sea bottom at a depth $H'_2$ of at least 20 m, and preferably of at least 50 m.

Advantageously, two of said stools are installed on the bottom of the port, in such a manner that the crane can assemble one wind turbine on a first stool while said catamaran boat transports a previously-assembled wind turbine from a second stool on which it was assembled to its installation site, and then returns to place a new base on said second stool, with said crane then being able to assemble a new wind turbine on said second stool while the same catamaran-type boat transports the assembled wind turbine from the first stool to its installation and then places it thereon, and then handles and places a new base on said first stool, and so on.

BRIEF DESCRIPTION OF THE DRAWINGS

Other characteristics and advantages of the present invention appear in the light of the following description which refers to the accompanying drawings that illustrate preferred embodiments of the invention without any limiting character:

FIGS. 2A and 2B are plan views of a catamaran for transporting a wind-turbine base, respectively while being engaged around said base and while taking hold of said base;

FIG. 2C is a face view and an end view seen from the stern of the catamaran, as shown in FIG. 2A, showing its various depths of draught during the handling and the transport of the wind turbine together with its base to the site a sea;

FIGS. 3A, 3B, and 3C are face views showing the transfer of the base from a pontoon (FIG. 3A) to (FIG. 3B) a stool (FIG. 3C) by means of a catamaran of the invention; in FIG. 3B, the base is raised relative to the pontoon;

FIG. 4 is a side view of the installation of elements of the wind turbine 1 on a base resting on a stool;

FIG. 5A is a side view of a complete wind turbine resting on a stool, under the control of a catamaran while being raised in order to be disengaged from said stool, for transporting to the site;

FIG. 5B is a side view showing the optimum mean draught for the catamaran during the operation of towing to the site;

FIG. 5C is a side view showing the maximum draught of the catamaran during the operation of placing the base on the stone-covered installation site;

DETAILED DESCRIPTION OF THE PRESENTLY PREFERRED EMBODIMENTS

Figure 1A:
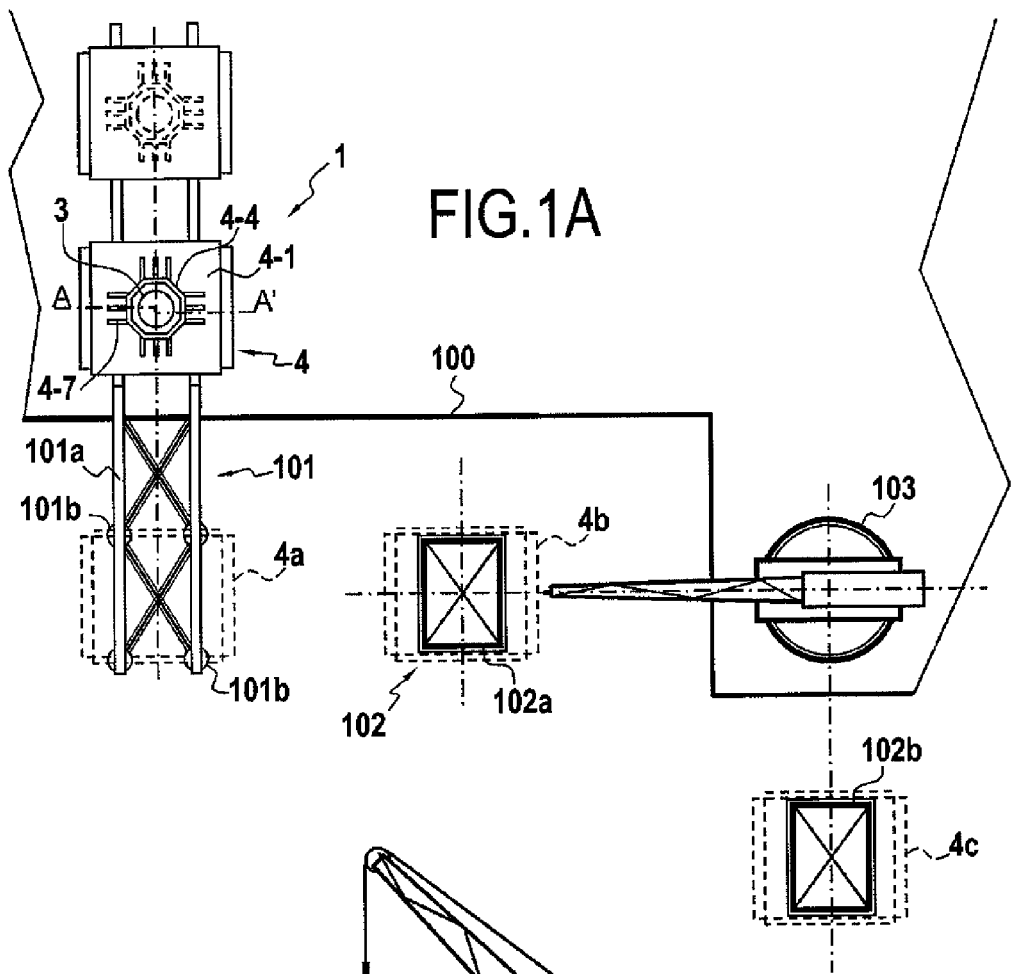
FIGS. 1A and 1B are respectively a plan view and a side view of a site situated close to a quay for on-land prefabrication of a wind-turbine base and for wind-turbine assembly prior to being transported to its installation site at sea.

FIG. 5C is a face view of an off-shore wind turbine 1 having a wind engine 2 comprising an electricity generator 2-3 and a rotor having a rotary shaft 2-2 of horizontal axis that is driven in rotation by said engine 2 and that supports three blades 2-1 at its end. Said engine 2 is installed at the top of a pylon 3 that is secured to a gravity base 4 that is ballasted after being installed on site by means of iron mineral granulate of specific gravity greater than 4 and contained within caissons of the base 4.

The base 4 is constituted by a rectangular box shaped bottom structure 4-1 having caissons that are for filling with ballast in the form of high-density granulates. It extends upwards in the form of a well 4-4 of height $H_1$ that is connected at its bottom portion by gusset type reinforcements 4-7 and that presents in its top portion a reinforced peripheral platform 5, preferably of machine-welded structure, that performs a function that is explained below in the following description of the invention. The inside of the well 4-4 is preferably circular and receives a bottom portion of the pylon 3 of the wind turbine. The bottom portion of the pylon 3 is received in fixed manner in the well 4-4.

Figure 6:
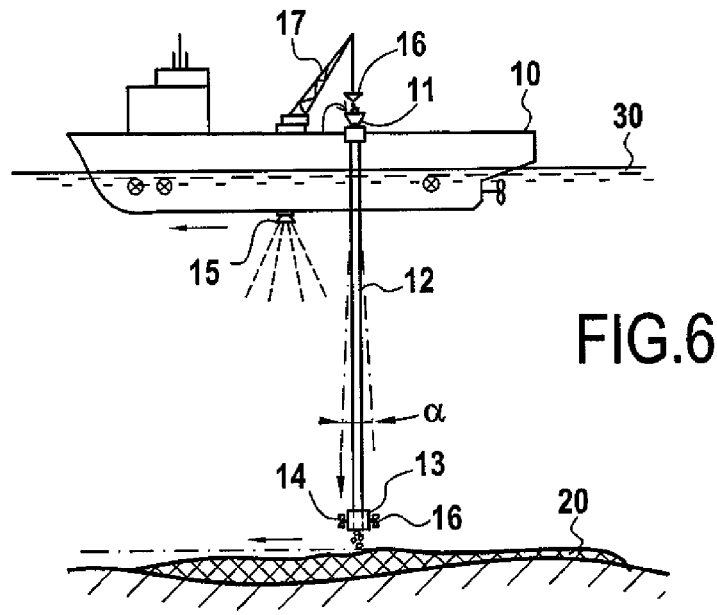
FIG. 6 is a side view of a ship in the process of covering the installation site in stone prior to receiving the gravity-structure base.

In known manner, the installation site is generally prepared by being covered in stones 20 in controlled manner from a ship on the surface as shown in FIG. 6. For this purpose, a ship 10 of the bulk carrier type, preferably having dynamic positioning, is fitted with a side hopper 11 connected to a lightweight pipe 12 extending downwards to within 1 m to 2 m above the sea bottom. A device 13 that is fitted with lateral thrusters 14 and a video camera (not shown) serves to move the bottom end of said pipe 12 in all directions so as to arrange accurately the zone onto which the granulates 16 are directed. Said granulate is loaded into the hopper 11 by a crane 17 and it then moves down along the pipe 12 so as to be deposited on the foundation 20. The stone-covering process is monitored on board the ship using a side-scan sonar 15 (known to the person skilled in the art) that serves to give a very accurate representation of the stone-covered surface. With such means it is possible to create stone-covered platforms having thicknesses of several meters over areas that may easily exceed 1000 square meters ($m^2$), and having a top level in which the maximum amount of variation lies in the range 0.2 m to 0.5 m. It may thus be considered that the base installed on the stone-covered foundation is substantially horizontal, but that installation proper of the base, together with its ballasting using heavy granulates is bound to create a small amount of depression that may differ between a right portion and a left portion. As a result, the axis ZZ of the base is not exactly vertical, which can be harmful for good long-term operation of the wind turbine, and more particularly in terms of swiveling the turret of the rotor head relative to the pylon.

Figure 1B:
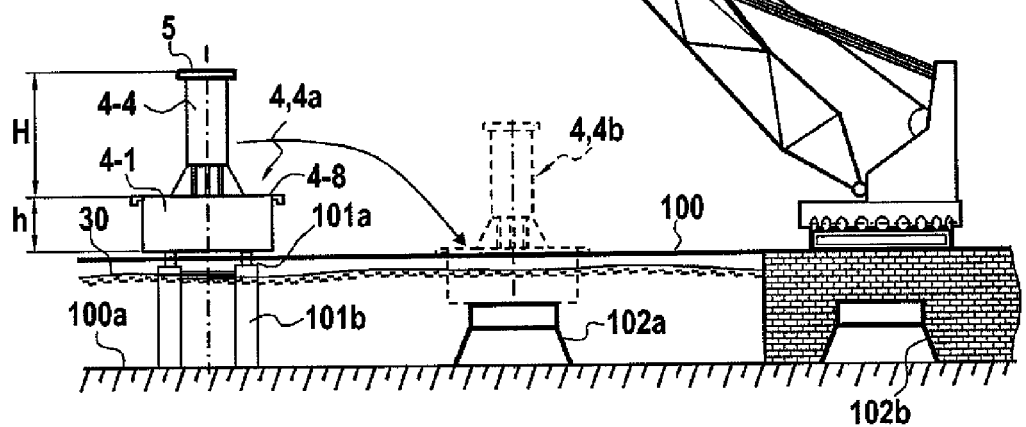

FIGS. 1A and 1B are respectively a plan view and a side view of a site for prefabricating wind-turbine bases and for assembling complete wind turbines ready for being transported fully-assembled to the installation field.

The site is preferably situated in a port environment. It is constituted by a deep-water quay 100, with the bases 4 being prefabricated on the quay, preferably one behind another. Thereafter, each base, once terminated, is ripped in known manner onto a pontoon 101 constituted by horizontal beams 101a extending from the quay and out over the water, said beams being supported above the surface 30 of the water by piles 101b resting on the bottom of the port 100a, with the base finally reaching a position 4a at the end of the pontoon 101. In this position 4a, the base is taken by a catamaran 110 shown in FIG. 2A so as to be transferred onto a stool 102 resting on the port bottom 100a. Once on the stool 102, the pylon 3 carrying the wind engine 2 and the electricity generator 2-3 is placed on the base 4 by means of a crane 103, and it is then fixed to said base.

The catamaran 110 is made up of a U-shaped floating structure constituted by two side floats 111a and 111b extending parallel in a longitudinal direction XX'. The end of each side float 111a, 111b situated on one side are connected together by a transverse connection structure 111c, preferably a transverse float 111c. The catamaran 110 presents a plurality of buoyancy chimneys, 112a, 112b, 112c, that are preferably positioned on said side and transverse floats, preferably one chimney per buoyancy element, preferably as far apart as possible from one another, in order to increase their return moments and thus the stability of the catamaran. This arrangement makes it possible to operate the catamaran with the option of varying its draught very greatly. As shown in FIG. 2C, which is an end view seen from the stern, relative to FIG. 2A, and restricted to the catamaran alone, said catamaran may be operated at two extreme draughts $H_0$ and $H_2$, and at intermediate levels $H'_0$, $H''_0$, $H'_1$, and $H_1$; with the draught $H_1$ corresponding to best overall stability, i.e. the stability that is required while transporting the complete wind turbine to the installation site at sea. These variations in draught are obtained by ballasting and unballasting compartments distributed in the various buoyancy elements 111a, 111b, 111c, and also, where appropriate, in the chimneys 112a, 112b, 112c.

The distribution of the chimneys, and their own sections, preferably situated as far as apart as possible from one another, in particular at the ends 104 of the side floats 111a and 111b and in the middle of the transverse float 111c ensures that the catamaran transporting the complete wind turbine together with its base has sufficient stability during the various stages of transport and installation on site, as shown in FIGS. 5A to 5C, since the chimneys always remain emerging at least in part out of the water at their top ends 113.

During the stage of transporting the complete wind turbine at sea to its site 20 (FIG. 5B), the draught must correspond to maximum stability, which corresponds to the middle draught $H_1$ as shown in FIG. 2C, thus making it possible in complete safety to cope with sea conditions that are severe in terms of swell, wind, and current, and possibly even a storm. Naturally, transport is preferably performed with adequate weather coverage.

With its various different draughts, the catamaran of the invention is capable, under excellent safety conditions, of performing operations on a fully terminated wind turbine such as transferring it in port, then transporting it to its site, and also installing it on site.

During transfer handling of the base in port between the pontoon 101 and the stool 102, the catamaran is as high as possible, going from a draught $H'_0$ to a minimum draught $H_0$ that is less than $H'_0$, as shown in FIG. 3B. Thereafter, once disengaged from the pontoon it may once more be stabilized as an intermediate draught greater than $H_0$. The overall stability is then generally sufficient since these operations are performed in a port, i.e. in a site that is protected.

In the final stage of placing the wind turbine on the bottom of the sea, FIG. 5C, the draught of the side floats is then at a maximum, corresponding to the draught $H_2$ in FIG. 2C. Overall stability is then less than that required during transport, but sufficient for an operation of placing the wind turbine and its face on the sea bottom when this operation is carried out in a calm sea, and given the stability provided by the chimneys 112a, 112b, and 112c.

The catamaran 110 has two said upper first reinforced structures 115a-115b, preferably metal structures in the form of plates arranged above the top surfaces 111-1 of the side floats 111a and 111b beside their inside faces or margins 114 facing towards the inside of the U-shape, and thus situated facing each other in the U-shape, at the top portions of the side floats 111a and 111b. Similarly, each of the side floats 111a and 111b includes in a low portion, likewise on said inner margins 114 facing towards the open space 105 of the U-shape, i.e. facing each other on the inside 105 of the U-shape, respective lower reinforced structures 116a and 116b forming steps. Said upper first reinforced surfaces 115a and 115b and said lower steps 116a and 116b thus co-operate with upper third reinforced structures of the base, referred to as reinforced side lugs 4-3 of the base 4, so as to perform handling of said bases.

If, as shown in FIGS. 3A to 3C, the lugs 4-3 consist in structural extensions extending all along the two top edges of the parallel opposite outer side walls 117 of the rectangular bottom structure 4-1 of the base 4, the upper reinforced structures 115a and 115b, and the bottom steps 116a and 116b for co-operating with said lugs 4-3 extend likewise longitudinally in the direction XX so as to be suitable for supporting said lugs 4-3 in contact with their under-faces 4-3a, where appropriate depending on the draught adopted by said side floats by said catamaran 110, as explained below.

When the complete base is in position 4a on the pontoon 101, as shown in FIG. 1A, the catamaran engages itself around said base in the position 4a on the pontoon as shown in FIG. 2A. Thereafter, once in place, as shown in FIG. 2B, the catamaran is de-ballasted so that the reinforced structures 115a and 115b come into contact with the under-faces 4-3a of the lugs 4-3 of the base 4, and then de-ballasting is continued until the base is raised (FIG. 3B) and is no longer in contact with the beams of the pontoon. The catamaran then reverses and extracts the base from the pontoon, and then it moves to one of the stools 102a, 102b in order to place the base thereon, as shown in FIG. 3C. When the catamaran is properly positioned relative to said stool, with the base being vertically above the stool, the catamaran is ballasted to the maximum so as to be relieved of the weight of the base as soon as the base rests on said stool. The de-ballasting is continued and the catamaran can then release itself from the base by reversing.

Once the base has been installed on its stool 102, a crane 103 of great carrying capacity and of great height then installs in succession a bottom portion of the pylon 3 in the well or socket 4-4 of the base 4, then the remainder of the pylon 3, then the generator 2-3, the engine 2 including the rotor 2-2, and finally the blades 2-1, as shown in FIG. 4.

Once the wind turbine 1 has been completely assembled, as shown in FIG. 5A, it is once more taken in charge by the catamaran 110, but this time via the bottom steps 116a and 116b coming into contact with the under-faces 4-3a of the lugs 4-3. The catamaran is then de-ballasted in order to reach a small draught H'$_0$ or H$_0$ as shown in FIG. 2C, 3A, or 3B, thereby enabling the base 4 to be lifted, and thus also lifting the completed wind turbine, and enabling it to be released from the stool 102. In order to provide maximum safety during transport to the site, the base is locked on its sides by horizontal and vertical clamping devices 120 and 121, such as mechanical or hydraulic actuators secured to each of the side floats. In particular, the vertical actuators 121 are secured to the high reinforcing side structures 115a and 115b, and the rods 121a of the actuators 121 as extended press against the top face of the rectangular bottom structure 4-1 of the base 4, or preferably press against the top faces of the side lugs 4-3, having their under-faces 4-3a held in the respective bottom steps 116a and 116b. Similarly, the horizontal actuators 120 are secured to the inside faces of the side floats 111a and 111B in their low portions below the bottom steps 116a and 116b and their extended rods come to bear against the side faces of said bottom rectangular structure 4-1 of the base 4. By actuating the horizontal actuators 120 of each float 111a and 111b, the actuators being positioned to face one another on each of the opposite floats, two facing horizontal actuators 120 exert identical thrusts in opposite directions so as to fix the bottom rectangular structure 4-1 of the base under the effect of thrust from the rods 120a of the horizontal actuators 120.

By proceeding in this way, the catamaran is fixed to the base and thus presents great overall rigidity so as to enable the wind turbine to be transported safely to its site using an intermediate draught H$_1$ of the catamaran floats, corresponding to best stability, after which the wind turbine can be placed on the stone-covered foundation 20 by ballasting the floats to a greater extent so that the catamaran adopts a maximum draught H$_2$, as shown in FIG. 5.

Because of the U-shape of such a catamaran, the catamaran generally presents relatively little twisting stiffness about its central horizontal longitudinal axis XX, regardless of any reinforcements that might be applied to the connections between the embodiments 111a, 111c, and 111b. By fixing the catamaran to the base using powerful mechanical locks 120 and 121, both in the horizontal plane and in the vertical plane, the twisting stiffness of the assembly is hugely increased.

Thus, the design of the catamaran is greatly simplified and less reinforcement is required in the connections between the float elements 111a, 111c, and 111b, thereby considerably reducing the cost and the complexity of building such a catamaran.

Advantageously, sufficient twisting stiffness is provided to ensure that the catamaran can transfer the base on its own safely from the position 4a at the end of the pontoon to the stool 102, it being understood that this handling takes place in a port zone, i.e. a protected zone, and preferably in calm weather.

Said catamaran preferably possesses a propulsion system associated with dynamic positioning so as to be independent and capable of maneuvering with accuracy, both in port and on site while putting the assembly in position. A control bridge 112d is then advantageously situated on a chimney 112c secured to the transverse connection float 111c, in a central position thereon.

In the embodiment of FIG. 5C, once the wind turbine has been put into place with the bottom 4-5 of the base resting on the stone covering 20 at the bottom of the sea, the catamaran is disengaged as follows. The bottoms 104 of the side and transverse floats come down to a depth that is slightly above the depth of the bottom 4-5 of the base 4 and of the stone covering 20, such that it is possible to ballast said floats additionally and thereby lower the catamaran and disengage the side lugs 4-3 against which it was bearing, and then move the catamaran as disengaged in this way once the various vertical and horizontal actuators 121 and 120 have been retracted, with the catamaran being moved in the longitudinal direction XX' along the outer side walls 117 of the base 4.

Figure 7:
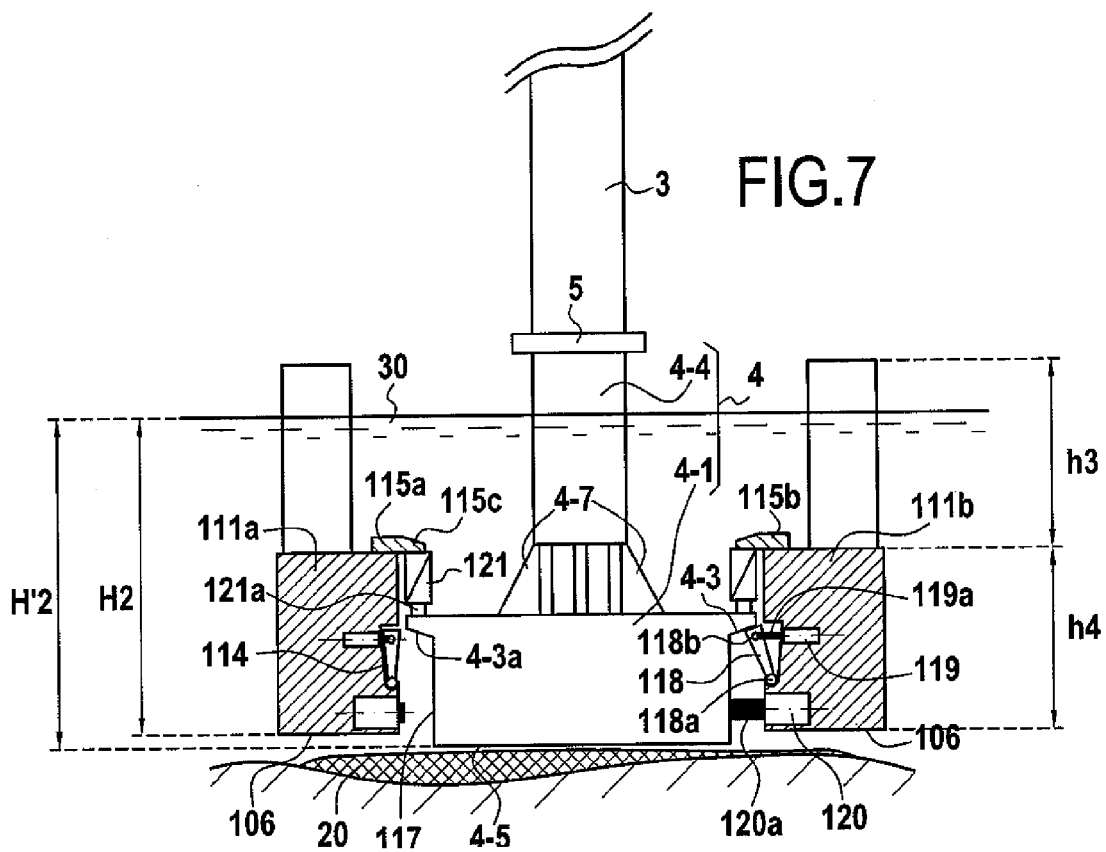
FIG. 7 is a side view in section of the catamaran showing a preferred technique for taking hold of the base at a low level.

In a preferred version of the invention as shown in FIG. 7, in order to simplify disengaging the catamaran after the base 4 has been put into place on the stone covering 20, said lower second reinforced structural elements of the side floats constitute hinged abutments 118 that are hinged to pivot about their bases at respective steps 116 of the inner margins 114 of the side floats, with said abutments 118 being pivoted by second horizontal actuators 119 that, after their rods 119*a* have been extended, cause the upper ends of the hinged abutments 118 to press against the under-faces of the side extensions or lugs 4-3 of the upper edges of the outer side walls 117 of the rectangular bottom structure 4-1 of the base 4.

This embodiment presents the advantage of being capable, after the wind turbine has been put into place on the sea bottom, of ballasting its floats in such a manner that the bottoms 106 thereof at a height $H'_2$ can disengage at a depth that is greater than $H'_2$ and less than $H_2$ so as to be able to release said second actuators 119 and retract the hinged abutments 118, as shown on the left in FIG. 7. It is thus possible to disengage the catamaran merely by de-ballasting the floats and rising vertically to the surface, without any need to move away along the longitudinal direction XX' in order to be disengaged from the base 4. The under-faces 4-3*a* of the side lugs 4-3 are preferably inclined so as to enable the hinged abutments 118 to be disengaged by pivoting from the outer side walls 117 of the bottom structure 4-1 of the base 4 towards the side floats 111*a*, 111*b* of the catamaran. Similarly, the upper reinforced plates 115*a*, 115*b* present top surfaces 115*c* that are preferably inclined at the same angle of inclination as the under-faces 4-3*a* of the side lugs 4-3 so as to be capable of fitting closely thereto over their entire surface areas when said upper first reinforcing elements 115*a*, 115*b* come to bear against the under-faces of said side lugs 4-3, in the gripping position corresponding to a said upper grip level as explained above during the initial stage of handling in the port.

This hinged-abutment embodiment, described with reference to FIG. 7, may be implemented using other means, such as abutments that move horizontally in translation, e.g. a large quantity of actuators 119 having their rods then coming into contact with the side lugs, or either directly or else via horizontally-sliding abutments that therefore work in bending and in shear, however the preferred version remains the hinged abutment, since it operates in simple compression at said abutment and in simple shear at its hinge with the structure of the catamaran.

In a preferred version shown in FIG. 1A, two stools 102*a* and 102*b* are installed in such a manner that when the crane 103 finishes off assembling one wind turbine on the stool 102*a*, and on return of the catamaran from the site for installing the preceding wind turbine, the catamaran begins by transferring a base 4*a* that is available on the pontoon 101 to said free stool 102*b*, while the crane 103 is assembling the pylon 3 and its wind engine 2 on the base 4 on the stool 102*a*. Thereafter, the catamaran takes charge of the fully-completed wind turbine on the stool 102*a* in order to transport it and install it on site. Thus, the crane 103 can immediately begin to assemble a new wind turbine on the stool 102*b*, while the catamaran is transporting said completed wind turbine and is installing it on site.

By way of illustration, the wind turbine of the invention comprises a pylon having a height lying in the range 50 m to 150 m, preferably not less than 100 m, with a tubular wall that presents a diameter lying in the range 2 m to 10 m, and more particularly in the range 6 m to 7 m. The base comprises a lower rectangular structure 4-1 of square section having a side of at least 20 m, preferably at least 30 m, and a height of 10 m that is partitioned by concrete partitions having a thickness of 20 centimeters (cm) to 30 cm, forming caissons 4-2 that are separated by vertical partitions. The length $L_1$ of the side floats in the longitudinal direction XX' and the width $L_2$ or distance between the lateral floats in the transverse direction YY' of the open space 105 of the U-shape are respectively slightly greater than the dimensions of the sides of said corresponding base that face them, so that said base can be inserted between said side floats. The tubular cavity 4-4 rises to a height H above the top face 4-8 of the rectangular structure 4-1 of the base 4, substantially at its center, by a height H lying in the range 15 m to 25 m, with the height h of the base lying in the range 5 m to 15 m. The height $h_3$ of the chimneys 112*a*, 112*b*, 112*c* lies in the range 15 m to 35 m, and the height $h_4$ of the floats 111*a*, 111*b*, 111*c* lies in the range 5 m to 10 m, such that it is possible to put the base down at a depth $H_2$ of up to 50 m.

In FIGS. 3C and 5A, the catamaran is locked to said base resting on the stool 102 respectively at said upper grip level (FIG. 3C) and at said lower grip level (FIG. 5A). The difference between the draughts $H'_1$-$H''_0$ of FIGS. 5A and 5C corresponds to the difference in height between said upper grip level and said lower grip level, i.e. in practice lying in the range 5 m to 10 m for floats having a height $h_4$ lying in the range 5 m to 15 m.

In FIG. 7, the difference in level $H'_2$-$H_2$ between the bottom 4-5 of the base and the bottoms 106 of the side floats under conditions in which said base is gripped at a said lower grip level is 2 m, and preferably less than 1 m.

By way of example, the off-shore wind turbine is constituted by a generator engine weighing 100 t, and a pylon having a diameter of about 3 m and a length L of about 90 m, weighing about 150 t.

The stability of a ship is catamaran, in known manner to the person skilled in the art of naval architecture, by the "metacentric height" GM, i.e. the distance between the center of gravity of the structure and the metacenter, i.e. substantially the point about which the ship pivots when it begins to heel. A conventional ship needs to have a (transverse) GMt greater than 0.5 m to 1 m in order to ensure good stability under all circumstances. Since the catamaran of the invention is substantially square in shape, it thus presents transverse and longitudinal metacentric heights GMt and GMl that are substantially similar.

Thus, for a catamaran having a total width of 72 m, a total length of 75 m, a main-hull height $h_4$ of 10 m, with three chimneys each presenting a section of 15 m×15 m and a height $h_3$ of 25 m, and presenting a U-shaped opening of 32 m×32 m suitable for taking hold of and transporting a wind turbine having a base measuring 30 m×30 m, a height of 10 m, and an empty weight of 6000 t, carrying a pylon having a height of 125 m and weighing 300 t, carrying a nacelle with a three-blade rotor weighing 250 t, the GM values for the various stages of handling and transport are substantially respectively as follows:

FIG. 3B, transfer of the base on its own from the pontoon to the stool: for a minimum draught $H_0$ of 0.75 m to 1.5 m, GM=60 m to 80 m;

FIG. 5B, transporting the completed wind turbine to its site: for an intermediate draught $H_1$ of 4 m to 7 m, GM=40 m to 45 m;

FIG. 5C, placing the completed wind turbine on its stone-covered foundation 20: for a maximum draught $H_2$ of 25 m to 30 m, GM=18 m to 22 m; and return to port of the empty catamaran: for an intermediate draught $H_1$ of 4 m to 7 m, GM=145 m to 160 m.

It can thus be seen that in spite of the considerable height of the center of gravity of the wind turbine due to the height of the pylon associated with its nacelle, the metacentric height remains well within the conventional safety standards for ships, specifically being greater than 15 m, thereby correspondingly facilitating the operations of installing wind turbines at sea using installation devices of the invention.

A catamaran of the invention built for taking hold of and handling bases of given size can thus install wind turbines of bases that are smaller, insofar as structures, preferably machine-welded structures are installed that are secured to said upper first reinforced structures 115a, 115b, or steps 116a, 116b, thereby filling the spaces between said supports and said reinforced side lugs 4-3 of the base.

The invention claimed is:

1. A catamaran boat suitable for use in assembling offshore wind turbines, in transporting them, and in placing them on the sea bottom, the wind turbine comprising at least: a base for resting on or being anchored to the sea bottom; a pylon suitable for being supported by said base; and a wind engine suitable for being fitted to the top of said pylon; said boat comprising two side floats having longitudinal axes arranged in parallel in the longitudinal direction XX', said side floats being connected together by a transverse connection structure, and a front transverse float extending in a direction YY' perpendicular to said longitudinal direction XX', and connecting together said front transverse float being connected to the two side floats at one of the ends of the two side floats so as to constitute a U-shaped floating structure; and the open space between the two branches of the U-shape constituted by the two side floats being suitable for receiving said base, said floats being fitted with gripper means suitable for gripping said base between said two side floats, said side floats including watertight compartments suitable for being ballasted and de-ballasted; wherein said gripper means are suitable for gripping said base at, at least the following two different grip levels: an upper grip level in which it is possible to grip said base when the bottom of said base is above the bottoms of said side floats and when said two side floats are at least partially de-ballasted; and a lower grip and lock level in which the bottom of the base is situated below the bottoms of said side floats, said gripper means of the base for said lower level including locking means for locking the base and suitable to provide a rigid connection between said side floats and said base, said gripper means and said locking means being secured to the side floats and to the base once the base is locked with the locking means at the lower grip level so that the base can be lowered merely by ballasting the side floats without movement of the base relative to the side floats.

2. The catamaran boat according to claim 1, wherein said locking means comprise: vertical clamping means co-operating with said base and each of the two side floats, suitable for blocking any vertical movement of the base relative to each of said side floats; and horizontal clamping means co-operating with said base and each of the two side floats, suitable for blocking any horizontal movement of the base relative to each of said side floats.

3. The catamaran boat according to claim 1, wherein: said gripper means at said upper grip level comprise upper reinforced structural elements of said base suitable for bearing against and being supported by upper reinforced structural elements of each of the two side floats when said two side floats are at least partially de-ballasted, the bottom of said base being situated above the bottoms of each of the two side floats; and said gripper and locking means at said lower grip level comprise: vertical upper clamping means suitable for vertically forcing upper reinforced structural elements of said base against lower reinforced structural elements of each of said side floats; and horizontal lower clamping means suitable for exerting horizontal thrusts in opposite directions between each of two opposite outer side walls of said base and respective ones of the two facing inner margins of each of said two side floats, thereby preventing any horizontal movement of said base relative to said two side floats.

4. The catamaran boat according to claim 2, wherein:
a) said gripper means comprise:
upper first reinforced structural elements in the form of plates extending in the longitudinal direction XX' of said side floats along the top edges of the inner margins of said side floats to which they are secured; and
lower second structural elements secured to said inner margins of the side floats and situated lower than said upper first reinforced structural elements; and
third reinforced structural elements secured to said base, extending along the opposite upper edges of the outer side walls of said base, such that:
said upper first reinforced structural elements of said side floats are suitable for supporting said upper third reinforced structural elements of said base in order to grip at said upper grip level, while said base is inserted between said two side floats and said two side floats are partially de-ballasted so as to exert upward thrust from said upper first reinforced structural elements of the side floats against said upper third reinforced structural elements of said base; and
said lower second reinforced structural elements of said side floats are suitable for supporting said upper third reinforced structural elements of said base in order to grip at a said lower grip level when said base is inserted between the two side floats and said side floats are partially de-ballasted in order to exert upward thrust from said lower second reinforced structural elements of the side floats against said upper third reinforced structural elements of said base;
b) said locking means of the gripper means at a lower grip level comprise:
vertical upper clamping means, at least some of which are secured to said upper first reinforced structural elements, said vertical upper clamping means being suitable for forcing said upper third reinforced structural elements of the base against said second reinforced structural elements of the side floats; and
horizontal lower clamping means, at least some of which are secured to the inner margins of said side floats below said lower second reinforced structural elements of the floats said lower clamping means being suitable for exerting thrust against said opposite outer side walls of said base.

5. The catamaran boat according to claim 4, wherein:
said vertical clamping means comprise vertical upper clamping actuators having their cylinders secured to said upper first reinforced structural elements and the ends of their rods suitable for forcing said upper third reinforced structural elements of the base against said second reinforced structural elements of the side floats in the form of steps; and
said horizontal lower clamping means comprise horizontal lower clamping actuators having their cylinders secured to the inner margins of said side floats below said lower second reinforced structural elements of the floats in the form of steps and their rods extending in opposite directions so as to exert thrust against said opposite outer side walls of said base.

6. The catamaran boat according to claim 4, wherein said lower second structural elements comprise steps in the inner margins of the side floats, in which steps pivotally-hinged abutments are suitable for being pivoted about their bases received in said steps by means of second horizontal actuators suitable for thrusting the upper ends of said abutments against the under-faces of said upper third reinforced structural elements in the form of side lugs of said base.

7. The catamaran boat according to claim 1, wherein said side floats are surmounted by upper buoyancy structures referred to as "chimneys" and of horizontal section smaller than the section of said side floats above which they extend over a height such that when said side floats are in a maximally-ballasted totally-submerged position, the top ends of said chimneys project above the water level.

8. The catamaran boat according to claim 7, including at least three chimneys including one chimney substantially on the axis of said boat in the middle of said transverse float, and two chimneys at the free stern ends of respective ones of the two side floats.

9. The catamaran boat according to claim 7, wherein the total height of said side floats h4 and of said chimneys h3 is such that said catamaran can adopt:
a minimum draught H0 in which said upper gripper means and/or the top surfaces of said side floats are at a height of at least 5 m above the water level; and
a maximum draught H2 of at least 25 m, in which said side floats are totally submerged and the top ends of said chimneys remain above the water.

10. The catamaran boat according to claim 7, wherein:
the height h4 of said side floats is at least 5 m; and
the height h3 of said chimneys is at least 15 m.

11. A method of handling and assembling an off-shore wind turbine in a port and/or of transporting it at sea and placing it on the sea bottom, the wind turbine comprising at least: a base for resting on or being anchored to the sea bottom; a pylon suitable for being supported by said base, preferably and having its bottom end fixed in said base; and a wind engine suitable for being fitted to the top of said pylon; the method making use of a catamaran boat according to claim 1 wherein the following initial steps are performed in succession: 1) gripping said base on its own using a said catamaran boat, in which the gripper means grip said base at a said upper grip level, the bottom of said base being situated above the water level; and 2) lifting said base relative to said pontoon by additionally de-ballasting said floats; and 3) moving said base by moving said boat within the port; and 4) placing said base on a support structure referred to as a "stool", resting on the bottom of the port, with this being done by ballasting said floats; and 5) disengaging said catamaran from said base; and 6) assembling said pylon on said base; and 7) gripping said base fitted with said wind turbine at said lower grip level, the bottom of said base being underwater; then 8) using said catamaran to transport said base fitted with said wind turbine out to sea; and 9) ballasting said floats so as to cause them to be completely underwater and placing said base on its installation site on the bottom of the sea; and 10) disengaging said catamaran from said base by unlocking said locking means, and then moving said catamaran and causing it to rise, reducing its draught, by de-ballasting its said floats at least in part.

12. The method according to claim 11, wherein a said assembled wind turbine is transported from an assembly site in the port to a site for installation at sea using said catamaran boat, by performing the following steps in succession: 1) taking hold of said wind turbine at its said base resting on said stool using said gripper means at said lower grip level, and locking said gripper means to lock said turbine base to said catamaran boat in such a manner that the connection between said base and said side floats is a rigid connection; and 2) raising said wind turbine so that the bottom of said base is disengaged from said stool, with this being done by additional de-ballasting of said floats; and 3) moving said wind turbine with said base locked to said catamaran boat to the site for installation at sea, said floats being ballasted with an intermediate draught; and 4) ballasting said floats so as to cause them to be totally underwater and placing said base on said installation site on the sea bottom; and 5) disengaging said catamaran from said base by unlocking said locking means and then moving said catamaran and causing said catamaran to rise, reducing the draught, by de-ballasting said floats, at least in part.

13. The method according to claim 12, wherein said floats include said chimneys, which chimneys remain partially underwater when said side floats are ballasted to lower and place said base on the sea bottom at a depth H'2 of at least 20 m.

14. The method according to claim 11, wherein two of said stools are installed on the bottom of the port, in such a manner that the crane can assemble one wind turbine on a first stool while said catamaran boat transports a previously-assembled wind turbine from a second stool on which it was assembled to its installation site, and then returns to place a new base on said second stool, with said crane then being able to assemble a new wind turbine on said second stool while the same catamaran boat transports the assembled wind turbine from the first stool to its installation and then places it thereon, and then handles and places a new base on said first stool, and so on.

* * * * *